(12) United States Patent
Nako et al.

(10) Patent No.: US 9,592,575 B2
(45) Date of Patent: Mar. 14, 2017

(54) WELD METAL HAVING EXCELLENT RESISTANCE TO HYDROGEN EMBRITTLEMENT SUSCEPTIBILITY

(75) Inventors: Hidenori Nako, Kobe (JP); Takuya Kochi, Kobe (JP); Wataru Urushihara, Kobe (JP); Munenobu Sato, Fujisawa (JP); Yoshihiko Kitagawa, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 187 days.

(21) Appl. No.: 14/110,556

(22) PCT Filed: Apr. 6, 2012

(86) PCT No.: PCT/JP2012/059599
§ 371 (c)(1),
(2), (4) Date: Oct. 8, 2013

(87) PCT Pub. No.: WO2012/137957
PCT Pub. Date: Oct. 11, 2012

(65) Prior Publication Data
US 2014/0086786 A1    Mar. 27, 2014

(30) Foreign Application Priority Data
Apr. 8, 2011  (JP) .................................. 2011-086727

(51) Int. Cl.
*B23K 35/30* (2006.01)
*B23K 9/02* (2006.01)
(Continued)

(52) U.S. Cl.
CPC ............ *B23K 35/3093* (2013.01); *B23K 9/02* (2013.01); *B23K 9/173* (2013.01);
(Continued)

(58) Field of Classification Search
CPC ...... B23K 9/02; B23K 35/3093; C22C 38/58; C22C 38/50
See application file for complete search history.

(56) References Cited

U.S. PATENT DOCUMENTS

| 6,264,760 B1 * | 7/2001 | Tamehiro et al. ............ 148/336 |
| 2002/0026969 A1 * | 3/2002 | Nakajima et al. ............ 148/648 |

(Continued)

FOREIGN PATENT DOCUMENTS

| CN | 1811000 A | 8/2006 |
| CN | 101918607 A | 12/2010 |

(Continued)

OTHER PUBLICATIONS

Extended European Search Report issued on Jul. 28, 2014 in Patent Application No. 12767441.4.

(Continued)

*Primary Examiner* — Rebecca Lee
(74) *Attorney, Agent, or Firm* — Oblon, McClelland, Maier & Neustadt, L.L.P.

(57) ABSTRACT

The weld metal of the present invention is formed by gas shield arc welding using a flux-cored wire, has a predetermined chemical component composition, and contains 20% or more of Ti. The amount of Ti-containing oxide particles having a circle-equivalent diameter of 0.15-1.0 μm is at least 5000 per square mm, the amount of V per total mass of weld metal present as a compound within the weld metal is 0.002% or more, and the average circle equivalent diameter of V-containing carbide present in the weld metal is 15 nm or less.

20 Claims, 3 Drawing Sheets

(UNIT: mm)

(51) Int. Cl.
*B23K 9/173* (2006.01)
*B23K 35/02* (2006.01)
*C22C 38/00* (2006.01)
*C22C 38/02* (2006.01)
*C22C 38/04* (2006.01)
*C22C 38/08* (2006.01)
*C22C 38/12* (2006.01)
*C22C 38/14* (2006.01)
*C22C 38/44* (2006.01)
*C22C 38/46* (2006.01)
*C22C 38/50* (2006.01)
*C22C 38/58* (2006.01)

(52) U.S. Cl.
CPC ...... *B23K 35/0266* (2013.01); *B23K 35/3053* (2013.01); *B23K 35/3066* (2013.01); *B23K 35/3073* (2013.01); *C22C 38/001* (2013.01); *C22C 38/002* (2013.01); *C22C 38/02* (2013.01); *C22C 38/04* (2013.01); *C22C 38/08* (2013.01); *C22C 38/12* (2013.01); *C22C 38/14* (2013.01); *C22C 38/44* (2013.01); *C22C 38/46* (2013.01); *C22C 38/50* (2013.01); *C22C 38/58* (2013.01); *B23K 2203/04* (2013.01)

(56) References Cited

U.S. PATENT DOCUMENTS

| | | |
|---|---|---|
| 2005/0016980 A1 | 1/2005 | Hara et al. |
| 2011/0250471 A1 | 10/2011 | Hara et al. |
| 2012/0021246 A1 | 1/2012 | Nako et al. |
| 2013/0315777 A1 | 11/2013 | Nako et al. |

FOREIGN PATENT DOCUMENTS

| | | |
|---|---|---|
| EP | 1 500 457 A1 | 1/2005 |
| EP | 2 671 668 A1 | 12/2013 |
| JP | 8 257785 | 10/1996 |
| JP | 11 147196 | 6/1999 |
| JP | 3208556 | 9/2001 |
| JP | 2001 348649 | 12/2001 |
| JP | 2004 315962 | 11/2004 |
| JP | 2005 40816 | 2/2005 |
| JP | 2008 087043 | 4/2008 |
| JP | 2010 115701 | 5/2010 |
| JP | 2010 274304 | 12/2010 |
| JP | 2011 000626 | 1/2011 |
| JP | 2011000626 A * | 1/2011 |
| WO | WO 2010/055788 A1 | 5/2010 |
| WO | WO 2010/110387 A1 | 9/2010 |

OTHER PUBLICATIONS

International Search Report Issued Jun. 19, 2012 in PCT/JP212/059599 Filed Apr. 6, 2012.

English translation of Written Opinion issued Jun. 19, 2012 in PCT/JP12/59599/ Filed Apr. 6, 2012.

* cited by examiner (UNIT: mm)

(UNIT: mm)

(UNIT: mm)

WELD METAL HAVING EXCELLENT RESISTANCE TO HYDROGEN EMBRITTLEMENT SUSCEPTIBILITY

TECHNICAL FIELD

The present invention concerns a weld metal with reduced susceptibility to hydrogen embrittlement used for welded structures.

BACKGROUND ART

When high tensile steel is welded, preheating/interpass temperature should be controlled strictly with a view point of preventing cold cracking of a weld metal portion, which lowers operation efficiency. In recent years, the strength of steels used for welded structures has become higher and a demand for higher strength has been increased also in weld metals (for example, HT780: high tensile 780 MPa grade).

Such increase in the strength tends to lower the cold cracking resistance and it is necessary to improve the cold cracking resistance. Particularly, since gas shield arc welding using a flux-cored wire has excellent welding workability, a technique for ensuring cold cracking resistance has been demanded in the weld metal formed by the welding method.

It is supposed that the cold cracking described above is attributable to segregation of diffusive hydrogen to grain boundaries to lower the strength at the grain boundaries (this is hereinafter referred to as "hydrogen embrittlement"), and for improvement of cold cracking resistance it is important how to decrease diffusion hydrogen.

In view of the above, for improving the cold cracking resistance of the weld metal, it is necessary to lower the susceptibility of the weld metal to hydrogen embrittlement and various techniques have been proposed from such a view point.

For example, Patent literature 1 discloses a technique of dispersing a Mo carbide (Mo-containing carbide) of high hydrogen trapping performance in a weld metal thereby preventing cold cracking. However, since it is necessary for this technique to adopt a specific welding method of applying submerge arc welding from the inside after abutting steel materials, it is not applicable generally to welding of steels.

Further, Patent literature 2 discloses a technique of preventing cold cracking of welded joints by dispersing a Si—Mn—Ti—Al composite oxide which is effective to trap diffusive hydrogen into a weld metal thereby preventing cold cracking in the welded joints. However, the level of the strength intended in this technique is 588.4 MPa or more in terms of tensile strength, and it cannot be said that a sufficient strength can be ensured.

Patent literature 3 proposes a technique of improving the cold cracking resistance by decreasing the amount of diffusive hydrogen, as well as properly controlling the strength and the chemical component composition. However, since a satisfactory strength level undergoes the effect of components, application cite is limited also in this technique upon actual operation.

Meanwhile, there are also proposed a technique of improving the cold cracking resistance by occluding diffusive hydrogen in a weld metal by addition of V and forming fine carbides thereby fixing carbon in the weld metal (for example, Patent literatures 4 and 5), a technique of imparting low temperature toughness, proof stress, and cracking resistance together by specifically controlling the flux components (for example, Patent literatures 6 and 7), etc. While each of the techniques described above intends to improve the cold cracking resistance, since the amount of hydrogen in the weld metal may possibly be increased by various factors in actual welding operation, it is necessary to improve the resistance to hydrogen embrittlement susceptibility in a more essential approach.

Further, Patent literature 8 also proposes a technique of making the strength and the toughness compatible by finely controlling the form of oxides containing Ti, Si, etc. and developing fine acicular ferrite structures on the oxides as nucleation sites. However, this technique has no consideration on the cold cracking resistance.

CITATION LIST

Patent Literature

Patent literature 1: Japanese Patent Laid-Open No. 2005-40816
Patent literature 2: Japanese Patent Laid-Open No. 2001-348649
Patent literature 3: Japanese Patent Laid-Open No. H11-147196
Patent literature 4: Japanese Patent Laid-Open No. H08-257785
Patent literature 5: Japanese Patent No. 3208556
Patent literature 6: Japanese Patent Laid-Open No. 2010-274304
Patent literature 7: Japanese Patent Laid-Open No. 2008-87043
Patent literature 8: Japanese Patent Laid-Open No. 2010-115701

SUMMARY OF INVENTION

Technical Problem

The present invention has been accomplished in view of the situations described above and intends to provide a weld metal having excellent resistance to hydrogen embrittlement susceptibility even at a high strength and not causing cold cracking.

Solution to Problem

The weld metal according to the present invention capable of solving the subjects described above has a feature that a weld metal formed by gas shield arc welding using a flux-cored wire contains; C: 0.02 to 0.12% (means "mass %" which is identical here and hereinafter for the chemical component composition), Si: 0.1 to 0.80%, Mn: 0.9 to 2.5%, Ni: 0.20 to 3.5%, Mo: 0.05 to 1.50%, Ti: 0.040 to 0.15%, V: 0.05 to 0.60%, N: 0.015% or less (not including 0%) and O: 0.030% or more respectively, with the balance of iron and unavoidable impurities, in which Ti-containing oxide particles containing Ti by 20% or more, and having a circle equivalent diameter of 0.15 to 1.0 μm are present by the number of 5,000/mm$^2$ or more, and the amount of V per total mass of the weld metal present as a compound in the weld metal is 0.002% or more and, further, an average circle equivalent diameter of the V-containing carbide present in the weld metal is 15 nm or less.

The "compound" means compounds such as nitride and carbonitride in addition to carbide. Further, the V-containing carbide means VC, as well as those containing other elements (for example, Ti, Nb, and Mo) by about 25 at % or less in total. The "circle equivalent diameter" means a diameter of a circle that is assumed to have an area equal with that of oxide particles or V-containing carbide present on the surface observed by an optical microscope or a transmission electron microscope (TEM).

In the weld metal of the present invention, at least one of 2.0% or less of Cr (not including 0%), 0.15% or less of Nb (not including 0%), 1.0% or less of Cu (not including 0%), 0.020% or less of Al (not including 0%), 0.10% or less of Zr (not including 0%), and 0.0050% or less of B (not including 0%) is preferably contained as other elements, in which characteristics of the weld metal are further improved in accordance with the kind of the elements to be contained.

Advantageous Effects of Invention

According to the present invention, since the number density of Ti-containing oxide particles of a predetermined size, the amount of V present as the compound in the weld metal, the size of the V-containing carbide present in the weld metal, etc. are properly controlled together with the chemical component composition, a weld metal having excellent resistance to hydrogen embrittlement susceptibility can be achieved.

DESCRIPTION OF EMBODIMENTS

Figure 1:
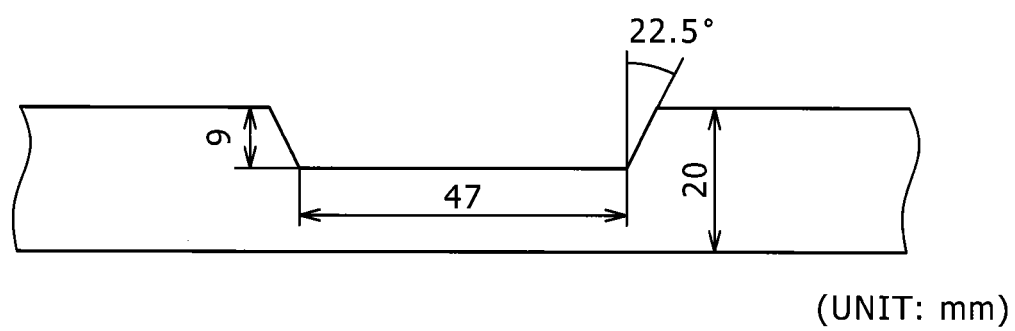
FIG. 1 is a schematic explanatory view illustrating the shape of an edge when manufacturing a weld metal.

The present inventors have made studies from various approaches on the means for improving the resistance to hydrogen embrittlement susceptibility in a high strength weld metal of HT780 class formed by gas shield arc welding using a flux-cored wire. As a result, it has been found that the resistance to the hydrogen embrittlement susceptibility is improved by causing the V-containing carbide acting as a trapping site of diffusive hydrogen to be present in an appropriate form and refining the structure by forming acicular ferrite on oxides as nucleation sites to accomplish the present invention.

That is, it has been found that the resistance to the hydrogen embrittlement susceptibility is improved in a weld metal of HT780 class by controlling the weld metal components to predetermined ranges, ensuring. Ti-containing oxide particles containing 20% or more of Ti and having a circle equivalent diameter of 0.15 to 1.0 μm by the number of 5000/mm$^2$ or more, and defining the V amount per total mass of the weld metal present as a compound in the weld metal (hereinafter sometimes referred to as "amount of compound type V") to 0.002% or more and, further, controlling the average circle equivalent diameter of the V-containing carbide present in the metal to 15 nm or less.

For enhancing the resistance to the hydrogen embrittlement susceptibility, reduction of diffusive hydrogen is effective. While it has been known so far that existence of V-containing carbide is effective in order to reduce the diffusive hydrogen, since it is difficult to properly precipitate the same in a weld metal particularly in a state as welded, it cannot be said that the V-containing carbide has been utilized effectively. In view of the above, the present inventors have made a study on the components of welding materials and welding conditions with a view point of promoting precipitation of the V-containing carbide and have succeeded in dispersing the V-containing carbide effective to the improvement of the hydrogen embrittlement susceptibility by controlling both of them appropriately. The reasons of defining such constituent factors are as described below.

[Number of Ti-Containing Oxide Particles Containing 20% or More of Ti and Having a Circle Equivalent Diameter of 0.15 to 1.0 μm: 5000/mm$^2$ or More]

Since the Ti-containing oxide particles containing 20% or more of Ti and having a circle equivalent diameter of 0.15 to 1.0 μm act as nucleation sites for intra-granular transformation, this remarkably refines the structure and effectively lowers the hydrogen embrittlement susceptibility. In order to provide such an effect, it is necessary that the number thereof is 5000/mm$^2$ or more. The number of the Ti-containing oxide particles is preferably 8000/mm$^2$ or more (more preferably, 9000/mm$^2$ or more). While the upper limit for the number of the Ti-containing oxide particles is not particularly restricted, it is preferably 40,000/mm$^2$ or less, more preferably, 30,000/mm$^2$ or less (further preferably, 20,000/mm$^2$ or less). The size of the Ti-containing oxide particles as an object of measurement is defined as 0.15 to 1.0 μm in terms of the circle equivalent diameter, because the performance as the nucleation site for the intra-granular transformation is deteriorated if the circle equivalent diameter is less than 0.15 μm and, on the other hand, intra-granular transformation occurs at a higher temperature to deteriorate the strength if a great amount of particles greater than 1.0 μm are present.

[Amount of Compound Type V in Weld Metal: 0.002% or More]

If the amount of the compound type V is less than 0.002%, the amount of the V-containing carbide as the diffusive hydrogen trap site becomes insufficient. The amount of the compound type V is preferably 0.003% or more (more preferably, 0.005% or more). Further, a preferred upper limit of the amount of the compound type V is 0.05% or less and, more preferably, 0.03% or less (further preferably 0.02% or less).

[Average Circle Equivalent Diameter of the V-Containing Carbides Present in The Weld Metal: 15 Nm or Less]

Even when the amount of the compound type V is ensured as described above, if the average circle equivalent diameter of the V-containing carbides exceeds 15 nm, no sufficient trapping effect can be provided since the particles of the V-containing carbide becomes coarser and the number of V-containing carbide particles is smaller. The average circle equivalent diameter of the V-containing carbides present in the weld metal is preferably 12 nm or less and, more preferably, 10 nm or less.

Then, the chemical component composition in the weld metal of the invention is to be described. In the weld metal of the invention, it is also an important factor to appropriately control the chemical component composition and the reasons for defining the ranges are as described below.

[C, 0.02 to 0.12%]

C is an essential element for ensuring the strength of a weld metal and, in order to provide such an effect, it is necessary to incorporate C by 0.02% or more. It is preferably, 0.04% or more and, more preferably, 0.06% or more.

However, when the content of C exceeds 0.12%, the strength increases excessively to increase hydrogen embrittlement susceptibility (resistance to hydrogen embrittlement susceptibility is deteriorated). A preferred upper limit of the C-content is 0.10% and, more preferably, 0.08% or less.

[Si: 0.1 to 0.80%]

Si is a deoxidizing element and has an effect of cleaning the weld metal. In order to provide such an effect, it is necessary that the Si content is 0.1% or more. It is preferably contained by 0.25% or more and, more preferably, by 0.28% or more. However, if the Si content is excessive, since the grain boundary transformation on the oxide as the nucleation site is suppressed and the hydrogen embrittlement susceptibility becomes higher, it is necessary to restrict the Si content to 0.80% or less. It is restricted preferably to 0.7% or less and, further preferably, to 0.5% or less.

[Mn: 0.9 to 2.5%]

Mn is an element necessary for ensuring the strength of the weld metal and it should be contained by 0.9% or more for providing such an effect. It is preferably 1.2% or more and, more preferably, 1.5% or more. However, if it is contained by in excess of 2.5%, this increases the hydrogen embrittlement susceptibility due to excess increase of the strength. It is preferably 2.2% or less and, more preferably, 2.0% or less.

[Ni: 0.20 to 3.5%]

Ni is an element necessary for ensuring the strength of the weld metal and it should be contained by 0.20% or more for providing such an effect. It is preferably 0.5% or more and, more preferably, 1.0% or more. However, if it is contained by in excess of 3.5%, this increases the hydrogen embrittlement susceptibility due to excess increase of the strength. It is preferably 3.0% or less and, more preferably, 2.8% or less.

[Mo: 0.05 to 1.50%]

Mo is an element necessary for ensuring the strength of the weld metal and it is necessary to be contained by 0.05% or more for providing such an effect. It is preferably 0.10% or more and, more preferably, 0.2% or more. However, if it is contained by in excess of 1.50%, this increases the hydrogen embrittlement susceptibility due to excess increase of the strength. It is preferably 1.0% or less and, more preferably, 0.50% or less.

[Ti: 0.040 to 0.15%]

Ti is an element which is effective for improving the resistance to hydrogen embrittlement susceptibility by forming oxide as a nucleation site for the intra-granular transformation to refine the structure. It is necessary to be contained by 0.040% or more for providing such an effect. It is preferably 0.050% or more and, more preferably, 0.055% or more. However, if it is contained by in excess of 0.15%, this increases the hydrogen embrittlement susceptibility due to excess increase of the strength. It is preferably 0.12% or less and, more preferably, 0.08% or less.

[V: 0.05 to 0.60%]

V is an element effective for improving resistance to the hydrogen embrittlement susceptibility by forming the V-containing carbide acting as a trapping site of diffusive hydrogen. It is necessary to be contained by 0.05% or more for providing such an effect. It is preferably 0.1% or more and, more preferably, 0.15% or more. However, if it is contained by in excess of 0.60%, this increases the strength excessively to increase the hydrogen embrittlement susceptibility.

[N: 0.015% or Less (not Including 0%)]

N is an inevitably introduced element and effective for the improvement of the strength of the weld metal. However, if it is contained in excess, it causes increase of the hydrogen embrittlement susceptibility due to excess increase of the strength. In view of the above, it is necessary to define the N content to 0.015% or less. It is preferably, 0.010% or less and, more preferably, 0.006% or less. It is industrially difficult to decrease N to 0%.

[O: 0.030% or More]

O is an element effective for the improvement of the resistance to the hydrogen embrittlement susceptibility by forming the oxide as the nucleation site for the intra-granular transformation to refine the structure. It is necessary to be contained by 0.030% or more for providing such an effect. It is preferably 0.035% or more and, more preferably, 0.040% or more. While the upper limit of the O content is not particularly restricted, it is preferably 0.10% or less (more preferably, 0.080% or less) since excess content gives an undesired effect on the toughness.

Incorporated elements defined in the invention are as described above and the balance comprises iron and unavoidable impurities. As the unavoidable impurities, intrusion of elements to be carried in (for example, P, S, and Sn) depending on the situation of raw materials, equipment materials, production facilities, etc. is allowable. However, since the impurities are generally segregated at the grain boundaries to lower the grain boundary strength and promote cold cracking, it is preferred to restrict, particularly, P to 0.02% or less (not including 0%) and 5 to 0.025% or less (not including 0%) respectively. Other unavoidable impurities than those described above are preferably 0.010% or less in total (not including 0%).

In the weld metal according to the invention, it is preferred to further incorporate other elements such as (a) one or more of elements selected from the group consisting of 2.0% or less (not including 0%) of Cr, 0.15% or less (not including 0%) of Nb, and 1.0% or less (not including 0%) of Cu, (b) 0.020% or less (not including 0%) of Al, and/or 0.10% or less (not including 0%) of Zr, and (c) 0.0050% or less (not including 0%) of B, and characteristics of the weld metal are further improved depending on the kind of the elements to be incorporated. The reasons for defining the ranges upon incorporation of such elements are as described below.

[One or More Elements Selected from the Group Consisting of 2.0% or Less (Not Including 0%) of Cr, 0.15% or Less (not Including 0%) of Nb and 1.0% or Less (not Including 0%) of Cu]

Cr, Nb, and Cu are elements effective for improving the strength of the weld metal. Among them, Cu acts effectively also for ensuring the cold toughness. However, if such elements are contained in excess, they increase the hydrogen embrittlement susceptibility due to excess increase of the strength. In view of the above, it is preferred to restrict Cr to 2.0% or less (more preferably, 1.5% or less and, further preferably, 1.0% or less), Nb to 0.15% or less (more preferably 0.10% or less and, further preferably, 0.08% or less), or Cu to 1.0% or less (more preferably, 0.5% or less and, further preferably, 0.2% or less) respectively. Preferred lower limits for providing the effect is 0.05% or more for Cr and 0.01% or more for Nb, and 0.05% or more for Cu (each of them is less than 0.01%, at a level of unavoidable impurity).

[Al: 0.020% or Less (not Including 0%) and/or Zr: 0.10% or Less (not Including 0%)]

Both of Al and Zr are strong deoxidizing elements and are effective for the cleaning of the weld metal. However, if they are contained in excess, oxides as nucleation sites for intra-granular transformation are decreased to increase the hydrogen embrittlement susceptibility due to growth of the structure. In view of the above, they are preferably restricted to 0.020% or less (more preferably, 0.018% or less) for Al, and to 0.10% or less (more preferably, 0.06% or less) for Zr respectively. A preferred lower limit for providing the effect is 0.01% or more (unavoidable impurity level of less than 0.01%).

[B: 0.0050% or Less (not Including 0%)]

B is an element for improving the strength by suppressing formation of ferrite from prior austenite grain boundaries. However, if B is contained in excess, the strength is increased excessively to increase the hydrogen embrittlement susceptibility. In view of the above, B is preferably restricted to 0.0050% or less (more preferably, 0.0030% or less). A preferred lower limit for providing the effect is 0.0010% or more (unavoidable impurity level of less than 0.0008%).

For the weld metal of the invention, while wire components and welding conditions are not particularly restricted so long as the weld metal is formed by gas shield arc welding using a flux-cored wire, preferred ranges are present for achieving the defined embodiment.

With the view points described above, preferred wire components (welding material) are, for example, those that satisfy all of the following requirements. That is:

based on the total mass of wire of an outer skin comprising a steel material and a flux, (a) the amount of Ti present in metal, oxide and other forms (total Ti amount) is 2.5 to 4.5% (mass %), (b) the amount of Al present in metal, oxide and other forms (total Al amount) is 0.10% (mass %) or more, (c) the amount of Al present as metal (total Al amount) is 0.01 to 0.05% (mass %) or more, (d) the amount of Zr present in metal, oxide and other forms (total Zr amount) is 0.035% (mass %) or more, and (e) the amount of Mg present as metal (metal Mg amount) is 0.4% (mass %) or more, and (f) the ratio [(Mn+Ti)/Si] between the amount of Si (total amount of Si) present in metal, oxide and other forms, and the amount of Mn+Ti (total amount of Mn and total amount of Ti) satisfies the following relation (1)

$$(Mn+Ti)/Si>10.0 \quad (1).$$

It is not particularly necessary to restrict other components. However, it is needless to say that they should be controlled so as to satisfy the defined ranges for the components of the weld metal.

The requirements (a) to (e) are defined for controlling the amount of the compound type V and the average circle equivalent diameter of the V-containing carbides. If they are outside of the ranges, the amount of the compound type V and the particle diameter of the V-containing carbide can no more be controlled within the predetermined ranges. Although the mechanisms thereof are not apparent at present, they can be estimated as below.

For precipitating the V-containing carbides by a great amount and finely, it is effective to finely disperse a second phase particles as the core thereof. It is estimated that since the Ti carbide is similar to the V-containing carbide in view of the crystal structure and is stable at a higher temperature, the carbide is formed finely before the V-containing carbide in the course of cooling upon welding to form precipitation-nuclei of the V-containing carbide at a lower temperature. Accordingly, for obtaining the V-containing carbide in a predetermined form, it is necessary to ensure Ti formed as the carbide. However, since Ti is a deoxidizing element and mostly fixed as an oxide, it is considered that Ti is partially reduced to form Ti carbides by controlling the more strongly deoxidizing Al, Zr, Mg, etc. to the ranges described above [requirements (b) to (e)].

With a view point of ensuring the Ti carbide, it is necessary that at least 2.5% or more of the entire Ti amount is to be ensured and more total Ti amount is preferred. However, if the amount exceeds 4.5%, the content in the weld metal exceeds the predetermined range. Further when metal Al exceeds 0.05%, the Ti-containing oxide particles contributing to the refinement of the structure can no more be obtained by a predetermined number [requirements (a), (c)].

The requirement (f) is for controlling the Ti-containing oxide particles that contribute to the refinement of the structure. When the component ratio is satisfied, predetermined Ti-containing oxide particles are formed and the bainite structure is refined due to the intra-granular transformation on the Ti-containing oxide particles as the nucleation sites. Further, by defining the ratio to more than 10.0, [the relation (1)], the Ti-containing oxide particles are dispersed at a high density and further refinement of the structure is attained which also leads to the improvement of the resistance to the hydrogen embrittlement susceptibility.

As the welding conditions for forming the weld metal, it is preferred to define the amount of heat input to 2.5 kJ/mm or less and use a gas mixture comprising 20% (vol %) of $CO_2$ with the balance of Ar as a shield gas. If the amount of heat input exceeds 2.5 kJ/mm, a cooling rate upon welding is lowered and the circle equivalent diameter of the V-containing carbides exceeds the predetermined upper limit. Further, the composition of the shield gas is determined with an aim of controlling the form of oxides for attaining refinement of the structure. In the invention, welding is performed by using a flux-cored wire and the rate of filling the flux of the wire to be used is usually about 10 to 20%.

EXAMPLE

The present invention is to be described more specifically by way of examples but the following examples do not restrict the invention but the invention can be practiced with appropriate modifications within a range conforming to the gist described above and to be described below and any of modifications is included in the technical range of the present invention.

Weld metals were manufactured by the following procedures using flux-cored wires (welding material) of chemical component compositions shown in the following Tables 1 and 2 at a wire diameter of 1.2 mm and a flux filling rate of 13.5%, and various performances (tensile strength, hydrogen embrittlement susceptibility) were evaluated. In the Tables 1 and 2, frames each containing "-" show no addition (no incorporation). In the Tables 1 and 2, the amounts of Mn, Si, Ti, and Zr show the total amount of Mn, the total amount of Si, the total amount of Ti, and the total amount of Zr respectively, and the amount of Mg represents the amount of metal Mg.

TABLE 1

| Welding material No. | \multicolumn{18}{c}{Chemical component composition of welding material (mass %)} | (Ti + Mn)/Si |
|---|---|---|---|---|---|---|---|---|---|---|---|---|---|---|---|---|---|---|---|
| | C | Si | SiO₂ | Mn | Ni | Mo | Ti | V | N | O | Cr | Nb | Cu | Total Al | Metal Al | Zr | Mg | B | Others* | |
| F1 | 0.11 | 0.41 | 0.27 | 2.6 | 2.45 | 0.15 | 3.26 | 0.45 | 0.002 | 2.45 | — | — | — | 0.13 | 0.014 | 0.044 | 0.47 | — | Balance | 14.3 |
| F2 | 0.10 | 0.41 | 0.27 | 2.2 | 0.55 | 0.15 | 3.26 | 0.45 | 0.002 | 2.45 | — | — | — | 0.13 | 0.014 | 0.044 | 0.47 | — | Balance | 13.3 |
| F3 | 0.08 | 0.41 | 0.27 | 2.4 | 0.81 | 0.15 | 3.26 | 0.45 | 0.002 | 2.45 | — | — | — | 0.13 | 0.014 | 0.044 | 0.42 | — | Balance | 13.8 |
| F4 | 0.10 | 0.41 | 0.27 | 2.2 | 0.55 | 0.15 | 3.26 | 0.25 | 0.002 | 2.45 | 0.80 | — | — | 0.13 | 0.014 | 0.044 | 0.47 | — | Balance | 13.3 |
| F5 | 0.10 | 0.41 | 0.27 | 2.2 | 0.55 | 0.15 | 3.26 | 0.25 | 0.002 | 2.45 | 0.32 | — | — | 0.13 | 0.014 | 0.044 | 0.47 | — | Balance | 13.3 |
| F6 | 0.11 | 0.41 | 0.27 | 2.6 | 1.90 | 0.15 | 3.26 | 0.25 | 0.002 | 2.45 | 0.46 | — | — | 0.13 | 0.014 | 0.044 | 0.47 | — | Balance | 14.3 |
| F7 | 0.11 | 0.41 | 0.27 | 2.6 | 2.75 | 0.52 | 3.26 | 0.45 | 0.002 | 2.45 | 0.80 | — | — | 0.13 | 0.014 | 0.044 | 0.47 | — | Balance | 14.3 |
| F8 | 0.10 | 0.41 | 0.27 | 2.2 | 1.95 | 0.52 | 3.26 | 0.25 | 0.002 | 2.45 | 1.25 | — | — | 0.13 | 0.014 | 0.044 | 0.47 | — | Balance | 13.3 |
| F9 | 0.11 | 0.41 | 0.27 | 2.2 | 2.75 | 0.15 | 3.26 | 0.45 | 0.002 | 2.45 | 0.46 | — | — | 0.13 | 0.014 | 0.044 | 0.47 | — | Balance | 13.3 |
| F10 | 0.10 | 0.45 | 0.27 | 2.2 | 0.55 | 0.15 | 3.26 | 0.45 | 0.002 | 2.45 | 0.25 | — | 0.48 | 0.13 | 0.014 | 0.044 | 0.47 | — | Balance | 12.1 |
| F11 | 0.08 | 0.55 | 0.27 | 2.4 | 0.55 | 0.51 | 3.26 | 0.25 | 0.002 | 2.55 | — | — | — | 0.35 | 0.014 | 0.044 | 0.47 | — | Balance | 10.3 |
| F12 | 0.05 | 0.41 | 0.27 | 2.4 | 2.25 | 0.15 | 3.26 | 0.22 | 0.002 | 2.45 | 0.80 | — | — | 0.13 | 0.011 | 0.044 | 0.47 | — | Balance | 13.8 |
| F13 | 0.14 | 0.41 | 0.27 | 2.6 | 2.75 | 0.10 | 3.26 | 0.25 | 0.002 | 2.45 | — | — | — | 0.13 | 0.014 | 0.044 | 0.47 | — | Balance | 14.3 |
| F14 | 0.14 | 0.38 | 0.27 | 2.6 | 1.10 | 0.15 | 3.26 | 0.25 | 0.002 | 2.45 | — | 0.10 | — | 0.13 | 0.014 | 0.044 | 0.47 | — | Balance | 15.4 |
| F15 | 0.10 | 0.20 | 0.20 | 2.2 | 0.55 | 0.08 | 3.26 | 0.45 | 0.002 | 2.45 | 0.50 | — | — | 0.13 | 0.014 | 0.044 | 0.47 | — | Balance | 27.3 |
| F16 | 0.11 | 0.85 | 0.27 | 4.2 | 1.33 | 0.35 | 4.42 | 0.45 | 0.002 | 2.50 | — | 0.18 | — | 0.15 | 0.032 | 0.044 | 0.47 | — | Balance | 10.1 |
| F17 | 0.10 | 0.41 | 0.27 | 3.8 | 1.10 | 0.15 | 3.26 | 0.50 | 0.002 | 2.45 | 0.98 | — | — | 0.13 | 0.014 | 0.044 | 0.47 | — | Balance | 17.2 |
| F18 | 0.10 | 0.41 | 0.27 | 1.7 | 0.55 | 0.50 | 3.26 | 0.25 | 0.002 | 2.45 | 0.68 | — | — | 0.14 | 0.027 | 0.044 | 0.47 | — | Balance | 12.1 |
| F19 | 0.11 | 0.41 | 0.27 | 2.6 | 0.35 | 0.15 | 3.51 | 0.25 | 0.002 | 2.45 | — | 0.03 | 0.15 | 0.13 | 0.014 | 0.044 | 0.47 | — | Balance | 14.9 |
| F20 | 0.10 | 0.41 | 0.27 | 2.2 | 0.55 | 0.15 | 3.26 | 0.16 | 0.002 | 2.45 | 0.80 | — | 0.15 | 0.13 | 0.014 | 0.044 | 0.47 | — | Balance | 13.3 |
| F21 | 0.10 | 0.41 | 0.27 | 2.2 | 3.32 | 0.15 | 3.26 | 0.35 | 0.002 | 2.45 | 0.80 | — | — | 0.13 | 0.014 | 0.038 | 0.47 | — | Balance | 13.3 |
| F22 | 0.10 | 0.41 | 0.27 | 2.2 | 0.80 | 1.18 | 3.26 | 0.45 | 0.002 | 2.45 | 0.38 | 0.06 | — | 0.13 | 0.014 | 0.044 | 0.47 | — | Balance | 13.3 |
| F23 | 0.08 | 0.41 | 0.27 | 2.2 | 1.65 | 0.90 | 3.11 | 0.25 | 0.002 | 2.45 | 1.60 | — | — | 0.13 | 0.014 | 0.044 | 0.47 | — | Balance | 13.0 |
| F24 | 0.11 | 0.41 | 0.27 | 2.7 | 2.75 | 0.15 | 3.26 | 0.10 | 0.002 | 2.45 | — | — | — | 0.13 | 0.014 | 0.044 | 0.47 | — | Balance | 14.5 |
| F25 | 0.11 | 0.41 | 0.27 | 2.6 | 2.85 | 0.15 | 3.26 | 0.55 | 0.002 | 2.45 | — | 0.09 | — | 0.13 | 0.014 | 0.044 | 0.47 | — | Balance | 14.3 |
| F26 | 0.10 | 0.43 | 0.27 | 1.9 | 2.55 | 0.65 | 3.26 | 0.60 | 0.002 | 2.45 | 0.98 | — | — | 0.16 | 0.045 | 0.044 | 0.47 | — | Balance | 12.0 |

*Others: Iron and unavoidable impurities

TABLE 2

| Welding material No. | \multicolumn{19}{c}{Chemical component composition of welding material (mass %)} | (Ti + Mn)/Si |
|---|---|---|---|---|---|---|---|---|---|---|---|---|---|---|---|---|---|---|---|
| | C | Si | SiO₂ | Mn | Ni | Mo | Ti | V | N | O | Cr | Nb | Cu | Total Al | Metal Al | Zr | Mg | B | Others* | |
| F27 | 0.08 | 0.41 | 0.27 | 2.4 | 1.75 | 0.15 | 3.26 | 0.45 | 0.002 | 2.45 | — | — | | | | | | | | |
| F28 | 0.05 | 0.41 | 0.27 | 2.0 | 0.55 | 0.15 | 3.26 | 0.25 | 0.002 | 2.45 | — | — | | | | | | | | |
| F29 | 0.08 | 0.41 | 0.27 | 2.6 | 0.55 | 0.15 | 3.26 | 0.45 | 0.002 | 2.55 | 0.45 | — | | | | | | | | |
| F30 | 0.12 | 0.43 | 0.27 | 2.6 | 2.75 | 0.15 | 3.26 | 0.25 | 0.002 | 2.45 | 0.10 | — | | | | | | | | |
| F31 | 0.10 | 0.75 | 0.27 | 3.8 | 0.55 | 0.15 | 3.88 | 0.45 | 0.002 | 2.45 | — | — | | | | | | | | |
| F32 | 0.10 | 0.41 | 0.27 | 2.2 | 2.71 | 0.15 | 3.26 | 0.45 | 0.002 | 2.43 | — | — | | | | | | | | |
| F33 | 0.10 | 0.41 | 0.27 | 2.2 | 0.21 | 0.15 | 3.26 | 0.45 | 0.002 | 2.45 | — | — | | | | | | | | |
| F34 | 0.11 | 0.55 | 0.27 | 2.7 | 0.51 | 0.35 | 3.26 | 0.45 | 0.002 | 2.45 | — | — | | | | | | | | |
| F35 | 0.10 | 0.41 | 0.27 | 1.2 | 0.55 | 0.15 | 3.26 | 0.25 | 0.002 | 2.45 | 0.80 | — | | | | | | | | |
| F36 | 0.10 | 0.41 | 0.27 | 3.2 | 0.55 | 0.05 | 3.26 | 0.16 | 0.002 | 2.45 | — | — | | | | | | | | |
| F37 | 0.04 | 0.41 | 0.27 | 2.6 | 2.75 | 0.15 | 3.26 | 0.45 | 0.002 | 2.45 | — | — | | | | | | | | |
| F38 | 0.20 | 0.41 | 0.27 | 2.6 | 0.55 | 0.15 | 3.26 | 0.45 | 0.002 | 2.45 | — | — | | | | | | | | |
| F39 | 0.10 | 1.26 | 0.27 | 2.3 | 0.55 | 0.15 | 3.26 | 0.45 | 0.002 | 2.55 | 0.95 | — | | | | | | | | |
| F40 | 0.09 | 0.41 | 0.27 | 4.4 | 2.74 | 0.15 | 3.26 | 0.25 | 0.002 | 2.45 | — | — | | | | | | | | |
| F41 | 0.11 | 0.90 | 0.27 | 2.7 | 3.65 | 0.15 | 3.26 | 0.24 | 0.002 | 2.45 | — | — | | | | | | | | |
| F42 | 0.11 | 0.70 | 0.27 | 2.6 | 2.75 | 1.55 | 3.26 | 0.25 | 0.002 | 2.45 | — | — | | | | | | | | |
| F43 | 0.09 | 0.41 | 0.27 | 2.6 | 2.43 | 0.15 | 2.43 | 0.45 | 0.002 | 2.45 | — | — | | | | | | | | |
| F44 | 0.11 | 0.41 | 0.27 | 2.6 | 0.55 | 0.15 | 4.61 | 0.25 | 0.002 | 2.45 | — | — | | | | | | | | |
| F45 | 0.11 | 1.55 | 0.27 | 2.5 | 2.75 | 0.15 | 3.26 | 0.05 | 0.002 | 2.45 | 0.25 | — | | | | | | | | |
| F46 | 0.11 | 0.41 | 0.27 | 2.7 | 2.43 | 0.15 | 3.26 | 0.65 | 0.002 | 2.45 | — | — | | | | | | | | |
| F47 | 0.10 | 0.81 | 0.27 | 2.2 | 0.55 | 0.15 | 3.26 | 0.45 | 0.002 | 2.45 | 2.10 | — | | | | | | | | |
| F48 | 0.11 | 0.41 | 0.27 | 2.6 | 2.75 | 0.15 | 3.26 | 0.25 | 0.002 | 2.45 | — | 0.21 | | | | | | | | |
| F49 | 0.11 | 0.75 | 0.27 | 2.6 | 2.75 | 0.15 | 3.26 | 0.45 | 0.002 | 2.45 | — | — | | | | | | | | |
| F50 | 0.10 | 0.41 | 0.27 | 2.2 | 1.60 | 0.15 | 3.26 | 0.45 | 0.002 | 2.67 | — | — | | | | | | | | |
| F51 | 0.10 | 0.41 | 0.27 | 2.2 | 0.55 | 0.15 | 3.26 | 0.25 | 0.002 | 2.45 | — | — | | | | | | | | |
| F52 | 0.10 | 0.41 | 0.27 | 2.2 | 0.55 | 0.15 | 3.26 | 0.45 | 0.002 | 2.45 | — | — | | | | | | | | |

TABLE 2-continued

| | | | | | | | |
|---|---|---|---|---|---|---|---|
| F27 | — | 0.13 | 0.014 | 0.181 | 0.47 | — | Balance 13.8 |
| F28 | 0.80 | 0.13 | 0.014 | 0.044 | 0.47 | — | Balance 12.8 |
| F29 | — | 0.40 | 0.014 | 0.044 | 0.47 | 0.04 | Balance 14.3 |
| F30 | — | 0.13 | 0.014 | 0.250 | 0.47 | — | Balance 13.6 |
| F31 | — | 0.13 | 0.014 | 0.044 | 0.47 | 0.05 | Balance 10.2 |
| F32 | — | 0.09 | 0.014 | 0.044 | 0.47 | — | Balance 13.3 |
| F33 | — | 0.13 | 0.008 | 0.044 | 0.47 | — | Balance 13.3 |
| F34 | — | 0.17 | 0.055 | 0.044 | 0.47 | — | Balance 10.8 |
| F35 | — | 0.13 | 0.014 | 0.044 | 0.38 | — | Balance 10.9 |
| F36 | — | 0.13 | 0.014 | 0.031 | 0.47 | — | Balance 15.8 |
| F37 | — | 0.13 | 0.014 | 0.044 | 0.47 | — | Balance 14.3 |
| F38 | — | 0.13 | 0.014 | 0.044 | 0.47 | — | Balance 14.3 |
| F39 | — | 0.35 | 0.014 | 0.044 | 0.47 | 0.04 | Balance 4.4 |
| F40 | — | 0.13 | 0.014 | 0.044 | 0.47 | — | Balance 18.7 |
| F41 | — | 0.13 | 0.014 | 0.044 | 0.47 | — | Balance 6.6 |
| F42 | — | 0.13 | 0.014 | 0.044 | 0.47 | — | Balance 8.4 |
| F43 | — | 0.13 | 0.014 | 0.044 | 0.47 | — | Balance 12.3 |
| F44 | — | 0.13 | 0.014 | 0.044 | 0.47 | — | Balance 17.6 |
| F45 | — | 0.13 | 0.014 | 0.044 | 0.47 | — | Balance 3.7 |
| F46 | — | 0.13 | 0.014 | 0.044 | 0.47 | — | Balance 14.5 |
| F47 | — | 0.13 | 0.014 | 0.044 | 0.47 | — | Balance 6.7 |
| F48 | — | 0.13 | 0.014 | 0.044 | 0.47 | — | Balance 14.3 |
| F49 | 1.13 | 0.13 | 0.014 | 0.044 | 0.47 | — | Balance 7.8 |
| F50 | — | 0.60 | 0.014 | 0.044 | 0.47 | — | Balance 13.3 |
| F51 | — | 0.13 | 0.014 | 0.332 | 0.47 | — | Balance 13.3 |
| F52 | — | 0.13 | 0.014 | 0.044 | 0.47 | 0.006 | Balance 13.3 |

*Others: Iron and unavoidable impurities

[Manufacture of Weld Metal]

An SM490A steel plate was fabricated into a groove shape illustrated in FIG. 1, and gas shield arc welding was performed under the following welding conditions, to manufacture weld metals.

(Welding Condition)

Shield gas: Gas mixture of 20 vol % $CO_2$-80 vol % Ar

Current-voltage-welding speed: 270A-29V-3.0 to 4.5 mm/sec

Heat Input Condition (a) 1.74 kJ/mm (270A-29V-4.5 mm/sec)
(b) 2.37 kJ/mm (270A-29V-3.3 mm/sec)
(c) 2.61 kJ/mm (270 Å-29V-3.0 mm/sec)

Preheating—interpass temperature: 105 to 150° C.

Lamination method: 3-layer 13 pass

Figure 2:
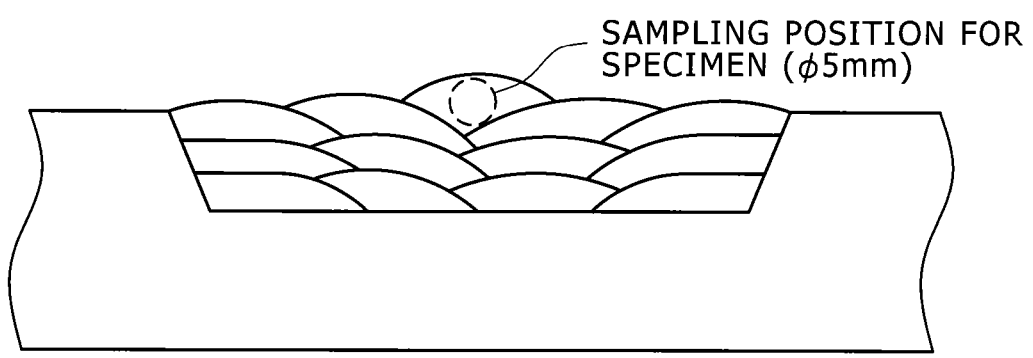
FIG. 2 is a schematic explanatory view illustrating a position for sampling a round bar specimen.
Figure 3:
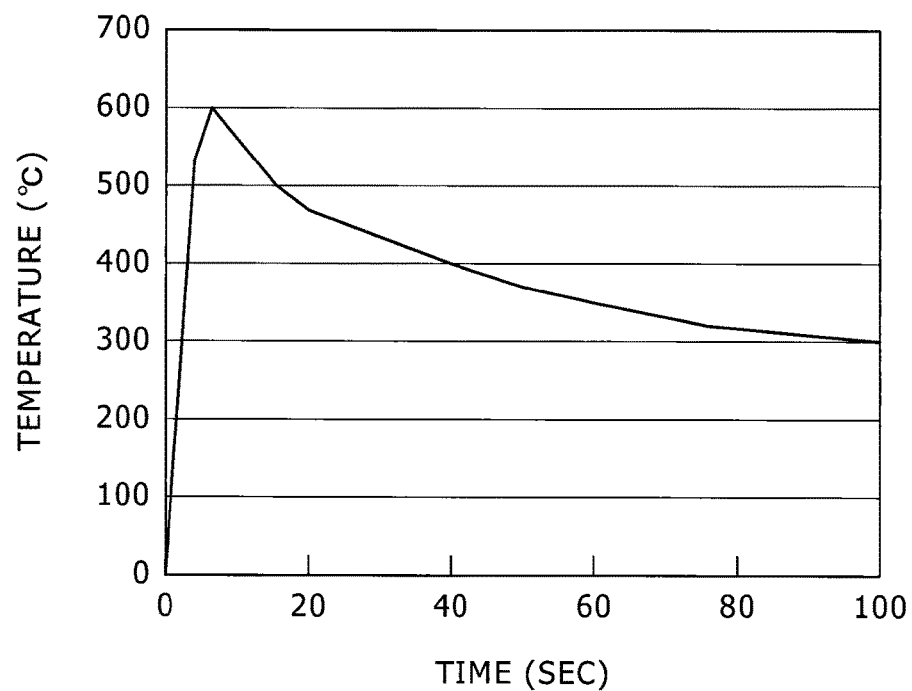
FIG. 3 is a graph showing a heat cycle (relation between time and temperature) that simulates a re-heating cycle.

Round bar specimens of 5 mm diameter were sampled from the final pass of the manufactured weld metals (the sampling position is illustrated in FIG. 2) and a heat cycle simulating a re-heating cycle was applied. FIG. 3 shows the heat cycle simulating the re-heating cycle (relation between time and temperature). The following Tables 3 and 4 show chemical component compositions for each of the manufactured weld metals together with the welding materials used and the heat input conditions. In the Tables 3 and 4, frames each containing "<" show the amount of impurities (less than the impurities level).

TABLE 3

| Test No. | Welding material No. | Heat input condition | Chemical component composition of weld metal** (mass %) | | | | | | | | | | | | | | |
|---|---|---|---|---|---|---|---|---|---|---|---|---|---|---|---|---|---|
| | | | C | Si | Mn | Ni | Mo | Ti | V | N | O | Cr | Nb | Cu | Al | Zr | B |
| 1 | F1 | (a) | 0.08 | 0.30 | 1.95 | 2.38 | 0.15 | 0.081 | 0.41 | 0.0038 | 0.042 | <0.01 | <0.01 | <0.01 | <0.01 | <0.01 | <0.0008 |
| 2 | F2 | (a) | 0.06 | 0.29 | 1.58 | 0.51 | 0.15 | 0.061 | 0.38 | 0.0048 | 0.058 | <0.01 | <0.01 | <0.01 | <0.01 | <0.01 | <0.0008 |
| 3 | F3 | (a) | 0.05 | 0.26 | 1.66 | 0.75 | 0.15 | 0.066 | 0.39 | 0.0078 | 0.053 | <0.01 | <0.01 | <0.01 | <0.01 | <0.01 | <0.0008 |
| 4 | F4 | (a) | 0.06 | 0.31 | 1.55 | 0.52 | 0.14 | 0.077 | 0.22 | 0.0042 | 0.048 | 0.78 | <0.01 | <0.01 | <0.01 | <0.01 | <0.0008 |
| 5 | F5 | (a) | 0.06 | 0.32 | 1.63 | 0.50 | 0.15 | 0.064 | 0.22 | 0.0067 | 0.051 | 0.31 | <0.01 | <0.01 | <0.01 | <0.01 | <0.0008 |
| 6 | F6 | (a) | 0.08 | 0.26 | 1.98 | 1.88 | 0.15 | 0.071 | 0.24 | 0.0055 | 0.064 | 0.45 | <0.01 | <0.01 | <0.01 | <0.01 | <0.0008 |
| 7 | F7 | (a) | 0.08 | 0.30 | 1.89 | 2.66 | 0.48 | 0.063 | 0.40 | 0.0046 | 0.059 | 0.8 | <0.01 | <0.01 | <0.01 | <0.01 | <0.0008 |
| 8 | F8 | (a) | 0.06 | 0.33 | 1.56 | 1.88 | 0.50 | 0.081 | 0.21 | 0.0053 | 0.056 | 1.21 | <0.01 | <0.01 | <0.01 | <0.01 | <0.0008 |
| 9 | F9 | (a) | 0.09 | 0.30 | 1.53 | 2.70 | 0.14 | 0.104 | 0.38 | 0.0063 | 0.071 | 0.45 | <0.01 | <0.01 | <0.01 | <0.01 | <0.0008 |
| 10 | F10 | (a) | 0.07 | 0.36 | 1.60 | 0.51 | 0.15 | 0.076 | 0.40 | 0.0058 | 0.049 | 0.25 | <0.01 | 0.45 | <0.01 | <0.01 | <0.0008 |
| 11 | F11 | (b) | 0.06 | 0.48 | 1.84 | 0.51 | 0.49 | 0.073 | 0.22 | 0.0047 | 0.046 | <0.01 | <0.01 | <0.01 | 0.015 | <0.01 | <0.0008 |
| 12 | F12 | (b) | 0.02 | 0.30 | 1.77 | 2.21 | 0.14 | 0.069 | 0.18 | 0.0066 | 0.058 | 0.81 | <0.01 | <0.01 | <0.01 | <0.01 | <0.0008 |
| 13 | F13 | (a) | 0.11 | 0.27 | 1.92 | 2.66 | 0.10 | 0.055 | 0.22 | 0.0072 | 0.042 | <0.01 | <0.01 | <0.01 | <0.01 | <0.01 | <0.0008 |
| 14 | F14 | (a) | 0.12 | 0.26 | 1.90 | 1.01 | 0.16 | 0.058 | 0.22 | 0.0061 | 0.033 | <0.01 | 0.08 | <0.01 | <0.01 | <0.01 | <0.0008 |
| 15 | F15 | (a) | 0.06 | 0.12 | 1.63 | 0.51 | 0.07 | 0.064 | 0.41 | 0.0050 | 0.047 | 0.48 | <0.01 | <0.01 | <0.01 | <0.01 | <0.0008 |
| 16 | F16 | (a) | 0.08 | 0.75 | 2.48 | 1.25 | 0.35 | 0.140 | 0.40 | 0.0081 | 0.049 | <0.01 | 0.14 | <0.01 | <0.01 | <0.01 | <0.0008 |
| 17 | F17 | (b) | 0.06 | 0.30 | 2.26 | 1.05 | 0.15 | 0.068 | 0.46 | 0.0077 | 0.071 | 0.95 | <0.01 | <0.01 | <0.01 | <0.01 | <0.0008 |
| 18 | F18 | (a) | 0.06 | 0.30 | 1.18 | 0.51 | 0.44 | 0.066 | 0.22 | 0.0063 | 0.052 | 0.66 | <0.01 | <0.01 | <0.01 | <0.01 | <0.0008 |
| 19 | F19 | (a) | 0.08 | 0.34 | 1.83 | 0.33 | 0.15 | 0.095 | 0.23 | 0.0088 | 0.070 | <0.01 | 0.02 | 0.13 | <0.01 | <0.01 | <0.0008 |
| 20 | F20 | (a) | 0.06 | 0.35 | 1.63 | 0.48 | 0.16 | 0.058 | 0.15 | 0.0092 | 0.046 | 0.8 | <0.01 | 0.13 | <0.01 | <0.01 | <0.0008 |
| 21 | F21 | (a) | 0.06 | 0.30 | 1.52 | 3.21 | 0.15 | 0.064 | 0.33 | 0.0036 | 0.051 | 0.79 | <0.01 | <0.01 | <0.01 | <0.01 | <0.0008 |

TABLE 3-continued

| Test No. | Welding material No. | Heat input condition | Chemical component composition of weld metal** (mass %) | | | | | | | | | | | | | |
|---|---|---|---|---|---|---|---|---|---|---|---|---|---|---|---|---|
| | | | C | Si | Mn | Ni | Mo | Ti | V | N | O | Cr | Nb | Cu | Al | Zr | B |
| 22 | F22 | (a) | 0.06 | 0.33 | 1.55 | 0.75 | 1.11 | 0.088 | 0.39 | 0.0048 | 0.051 | 0.36 | 0.04 | <0.01 | <0.01 | <0.01 | <0.0008 |
| 23 | F23 | (a) | 0.04 | 0.32 | 1.43 | 1.58 | 0.88 | 0.048 | 0.22 | 0.0089 | 0.082 | 1.55 | <0.01 | <0.01 | <0.01 | <0.01 | <0.0008 |
| 24 | F24 | (a) | 0.08 | 0.30 | 2.05 | 2.66 | 0.16 | 0.070 | 0.08 | 0.0054 | 0.058 | <0.01 | <0.01 | <0.01 | <0.01 | <0.01 | <0.0008 |
| 25 | F25 | (b) | 0.08 | 0.29 | 2.00 | 2.77 | 0.15 | 0.064 | 0.51 | 0.0045 | 0.054 | <0.01 | 0.06 | <0.01 | <0.01 | <0.01 | <0.0008 |
| 26 | F26 | (b) | 0.06 | 0.38 | 1.25 | 2.52 | 0.61 | 0.072 | 0.56 | 0.0080 | 0.052 | 0.96 | <0.01 | <0.01 | 0.01 | <0.01 | <0.0008 |

**Balance: Iron and unavoidable impurities

TABLE 4

| Test No. | Welding material No. | Heat input condition | Chemical component composition of weld metal** (mass %) | | | | | | | | | | | | | |
|---|---|---|---|---|---|---|---|---|---|---|---|---|---|---|---|---|
| | | | C | Si | Mn | Ni | Mo | Ti | V | N | O | Cr | Nb | Cu | Al | Zr | B |
| 27 | F27 | (a) | 0.05 | 0.31 | 1.71 | 1.71 | 0.16 | 0.077 | 0.41 | 0.0125 | 0.052 | <0.01 | <0.01 | <0.01 | <0.01 | 0.04 | <0.0008 |
| 28 | F28 | (a) | 0.03 | 0.34 | 1.35 | 0.52 | 0.15 | 0.086 | 0.22 | 0.0045 | 0.075 | <0.01 | <0.01 | 0.75 | <0.01 | <0.01 | <0.0008 |
| 29 | F29 | (a) | 0.04 | 0.30 | 2.03 | 0.51 | 0.15 | 0.091 | 0.41 | 0.0089 | 0.057 | 0.45 | <0.01 | <0.01 | 0.019 | <0.01 | 0.0021 |
| 30 | F30 | (a) | 0.10 | 0.38 | 1.90 | 2.70 | 0.14 | 0.080 | 0.22 | 0.0049 | 0.051 | 0.08 | <0.01 | <0.01 | <0.01 | 0.07 | <0.0008 |
| 31 | F31 | (a) | 0.06 | 0.63 | 2.21 | 0.52 | 0.15 | 0.115 | 0.38 | 0.0038 | 0.051 | <0.01 | <0.01 | <0.01 | <0.01 | <0.01 | 0.0031 |
| 32 | F1 | (c) | 0.07 | 0.28 | 1.88 | 2.36 | 0.15 | 0.077 | 0.40 | 0.0045 | 0.048 | <0.01 | <0.01 | <0.01 | <0.01 | <0.01 | <0.0008 |
| 33 | F32 | (a) | 0.06 | 0.38 | 1.55 | 2.64 | 0.14 | 0.063 | 0.40 | 0.0098 | 0.066 | <0.01 | <0.01 | <0.01 | <0.01 | <0.01 | <0.0008 |
| 34 | F33 | (a) | 0.06 | 0.30 | 1.68 | 0.18 | 0.15 | 0.083 | 0.40 | 0.0049 | 0.057 | <0.01 | <0.01 | <0.01 | <0.01 | <0.01 | <0.0008 |
| 35 | F34 | (a) | 0.07 | 0.48 | 1.75 | 0.48 | 0.32 | 0.064 | 0.41 | 0.0048 | 0.048 | <0.01 | <0.01 | <0.01 | 0.011 | <0.01 | <0.0008 |
| 36 | F35 | (a) | 0.04 | 0.30 | 0.84 | 0.51 | 0.14 | 0.105 | 0.22 | 0.0089 | 0.053 | 0.78 | <0.01 | <0.01 | <0.01 | <0.01 | <0.0008 |
| 37 | F36 | (a) | 0.06 | 0.31 | 2.03 | 0.52 | 0.04 | 0.099 | 0.15 | 0.0070 | 0.046 | <0.01 | <0.01 | <0.01 | <0.01 | <0.01 | <0.0008 |
| 38 | F37 | (a) | 0.01 | 0.33 | 1.84 | 2.66 | 0.15 | 0.081 | 0.41 | 0.0051 | 0.094 | <0.01 | <0.01 | <0.01 | <0.01 | <0.01 | <0.0008 |
| 39 | F38 | (a) | 0.13 | 0.31 | 1.71 | 0.51 | 0.15 | 0.051 | 0.38 | 0.0052 | 0.035 | <0.01 | <0.01 | <0.01 | <0.01 | <0.01 | <0.0008 |
| 40 | F39 | (a) | 0.06 | 0.83 | 1.72 | 0.51 | 0.16 | 0.072 | 0.39 | 0.0052 | 0.053 | 0.91 | <0.01 | <0.01 | 0.018 | <0.01 | 0.0019 |
| 41 | F40 | (a) | 0.05 | 0.29 | 2.61 | 2.70 | 0.14 | 0.062 | 0.21 | 0.0079 | 0.059 | <0.01 | <0.01 | <0.01 | <0.01 | <0.01 | <0.0008 |
| 42 | F41 | (a) | 0.06 | 0.66 | 1.48 | 3.58 | 0.16 | 0.082 | 0.21 | 0.0063 | 0.047 | <0.01 | <0.01 | <0.01 | <0.01 | <0.01 | <0.0008 |
| 43 | F42 | (a) | 0.08 | 0.46 | 1.88 | 2.66 | 1.53 | 0.076 | 0.22 | 0.0082 | 0.046 | <0.01 | <0.01 | <0.01 | <0.01 | <0.01 | <0.0008 |
| 44 | F43 | (b) | 0.05 | 0.28 | 1.86 | 2.37 | 0.15 | 0.036 | 0.39 | 0.0063 | 0.066 | <0.01 | <0.01 | <0.01 | <0.01 | <0.01 | <0.0008 |
| 45 | F44 | (b) | 0.06 | 0.28 | 1.58 | 0.52 | 0.15 | 0.158 | 0.22 | 0.0044 | 0.069 | <0.01 | <0.01 | <0.01 | <0.01 | <0.01 | <0.0008 |
| 46 | F45 | (a) | 0.09 | 0.96 | 1.72 | 2.70 | 0.16 | 0.069 | 0.04 | 0.0064 | 0.074 | 0.24 | <0.01 | <0.01 | <0.01 | <0.01 | <0.0008 |
| 47 | F46 | (a) | 0.08 | 0.31 | 1.99 | 2.35 | 0.16 | 0.058 | 0.62 | 0.0087 | 0.051 | <0.01 | <0.01 | <0.01 | <0.01 | <0.01 | <0.0008 |
| 48 | F47 | (a) | 0.06 | 0.49 | 1.50 | 0.51 | 0.15 | 0.080 | 0.40 | 0.0047 | 0.072 | 2.05 | <0.01 | <0.01 | <0.01 | <0.01 | <0.0008 |
| 49 | F48 | (a) | 0.08 | 0.34 | 1.96 | 2.69 | 0.14 | 0.068 | 0.21 | 0.0079 | 0.057 | <0.01 | 0.16 | <0.01 | <0.01 | <0.01 | <0.0008 |
| 50 | F49 | (a) | 0.07 | 0.48 | 1.85 | 2.70 | 0.15 | 0.072 | 0.39 | 0.0054 | 0.050 | <0.01 | <0.01 | 1.08 | <0.01 | <0.01 | <0.0008 |
| 51 | F50 | (a) | 0.06 | 0.33 | 1.61 | 1.55 | 0.15 | 0.061 | 0.41 | 0.0055 | 0.042 | <0.01 | <0.01 | <0.01 | 0.021 | <0.01 | <0.0008 |
| 52 | F51 | (a) | 0.06 | 0.27 | 1.58 | 0.50 | 0.15 | 0.091 | 0.21 | 0.0090 | 0.041 | <0.01 | <0.01 | <0.01 | <0.01 | 0.11 | <0.0008 |
| 53 | F52 | (a) | 0.06 | 0.32 | 1.58 | 0.51 | 0.15 | 0.090 | 0.41 | 0.0045 | 0.054 | <0.01 | <0.01 | <0.01 | <0.01 | <0.01 | 0.0053 |

**Balance: Iron and unavoidable impurities

Figure 4:
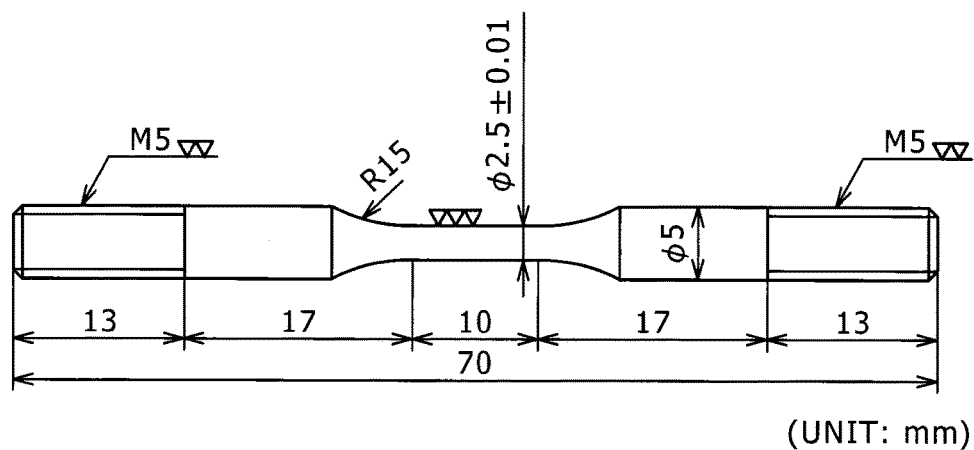
FIG. 4 is an explanatory view illustrating a configuration of a test specimen when carrying out a tensile test.
Figure 5:
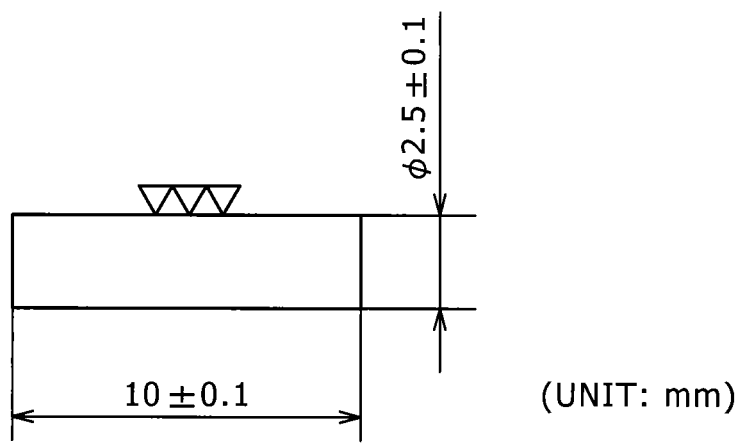
FIG. 5 is an explanatory view illustrating the shape of a specimen when hydrogen occluding amount is measured.

From the specimens after the heat treatment, specimens for tensile test, and specimens for measuring hydrogen occluding amount (specimen for measuring hydrogen occluding amount) were sampled. FIG. 4 illustrates the shape of the specimen for tensile test and FIG. 5 illustrates the shape of the specimen for measuring the hydrogen occluding amount, respectively. The hydrogen embrittlement susceptibility was evaluated using the specimens by the following method.

[Evaluation for Hydrogen Embrittlement Susceptibility]

The specimens for measuring the hydrogen occluding amount obtained as described above were used and a hydrogen charging condition to provide the amount of diffusive hydrogen=1.5 to 3.0 ppm was selected. The charging condition adopted therein is as described below.
Aqueous solution: (0.5 mol/L or 2.5 mol/L of $H_2SO_4$)+1 g/L-KSCN, (30 g/L-NaCl)+1 g/L-KSCN)
Current density: 0.1 A/dm², 1.0 A/dm², 5.0 A/dm²
Charging time: 24 hours
Further, the amount of diffusive hydrogen was determined as an amount of hydrogen released up to 300° C. at a temperature elevation rate of 12° C./min by using a thermal desorption spectroscope incorporating a quadrapole mass spectroscope (manufactured by Nichiden Anelva Corp.).

After performing hydrogen charging to the specimens for tensile test under the conditions described above, zinc plating for preventing hydrogen escape was applied under the following conditions.
Aqueous solution: (350 g/L-$ZnSO_4 \cdot 7H_2O$)+(20.6 g/L-$H_2SO_4$(97%))+60 g/L-$Na_2SO_4$)
Bath temperature: 60° C.
Current density: 50 A/dm²
Plating time: 3 min.

SSRT (Slow Strain Rate Technique) test was practiced at a crosshead speed of: $5.0 \times 10^{-3}$ mm/min (strain rate: $6.94 \times 10^{-6}$/sec) and those having a hydrogen embrittlement susceptibility index S (%) calculated by the following relation (2) of less than 60% were evaluated as excellent for hydrogen embrittlement susceptibility, assuming the elongation at break of the non-hydrogen charged material as $E_0$ and elongation at break of the hydrogen charged material as $E_h$:

$$S = (1 - E_h/E_0) \times 100 (\%) \qquad (2)$$

[Evaluation of Tensile Strength]

Tensile test specimens according to JIS-Z2202 were sampled from weld metals manufactured by applying 45° V-shaped edge to a SM490A steel sheet of 20 mm thickness under the following welding conditions (welding materials, shown in Table 1 and 2), and a tensile test was carried out, and those having a tensile strength in excess of 780 MPa were evaluated as good.

(Welding Condition)
Shield gas: gas mixture of 20 vol % $CO_2$-80 vol % Ar
Current-voltage-welding speed: 270A-29V-4.5 mm/sec
Amount of heat input: 1.74 kJ/mm
Preheating—interpass temperature: 105 to 150° C.
Lamination method: 8-layer 17 pass The number density of Ti-containing oxide particles containing 20% or more of Ti having a circle equivalent diameter of 0.15 to 1.0 μm, the amount of the compound type V in the weld metal, and the average circle equivalent diameter of the V-containing carbides present in the weld metal were measured by the following method.

[Measurement for Number Density of Ti-Containing Oxide Particles]

After sampling round bar specimens each of 5 mm diameter from the final pass of weld metals manufactured for SSRT test (refer to the preceding paragraph for the "manufacture of weld metal") and mirror polishing the diametrically sliced cross section, photographic images were taken for 2 view fields by an optical microscope under 1,000 magnifications. Oxide particles with the circle equivalent diameter of 0.15 to 1.0 μm were selected by an image analysis software ("Image-Pro Plus", manufactured by Media Cybernetics Co.) and the composition at the central portion of the photographed oxide was analyzed by SEM-EDS (energy dispersive X-ray spectroscopy). Among the detected elements, the analysis values for Ti (mass %) was normalized the total for the analysis value of Si, S, Ti, Mn, Al, Zr, and Mg (mass %) to calculate the Ti content (mass %) contained in the oxide particles and calculate the number density for oxide particles containing 20% or more of Ti and having a circle equivalent diameter of 0.15 to 1.0 μm.

[Amount of Compound Type V in Weld Metal]

After sampling round bar specimens each of 5 mm diameter×30 mm length from the final pass of the weld metals manufactured for SSRT test (refer to the preceding paragraph for the "manufacture of weld metal"), subjecting them to electrolytic extraction with 10 vol % acetyl acetone-1 vol % tetramethyl ammonium chloride-methanol solution, and filtering the same by a filter having a 0.1 μm filter pore size to obtain residues, the residues were subjected to ICP atomic emission spectroscopy to determine the amount of the compound type V.

[Average Circle Equivalent Diameter of V-Containing Carbide Present in the Weld Metal]

Round bar specimens each of 5 mm diameter were sampled from the final pass of weld metals manufactured for the SSRT test (refer to the preceding paragraph for the "manufacture of weld metal"), extraction replica TEM specimens were manufactured from the diametrically sliced cross section, photographic images were taken for one view field by an optical microscope under 300,000 magnification. Then, for the photographed V-containing carbides, circle equivalent diameters were measured for all particles having an area of 10 $nm^2$ or more by an image analysis software ("Image-Pro Plus", manufactured by Media Cybernetics Co.) to calculate the average value. The observed compound particles were put to elemental analysis by EDS (energy dispersion type spectroscopy) appended to TEM to judge the V-containing carbides.

The following Tables 5 and 6 show the results of the measurement, i.e., the hydrogen embrittlement susceptibility index S, the tensile strength, number density of the Ti-containing oxide particles, the amount of the compound type V, and the average circle equivalent diameter of the V-containing carbides.

TABLE 5

| Test No. | Ti-containing oxide particles (number/$mm^2$) | Amount of compound type V (mass %) | Average circle equivalent diameter of V-containing carbide (nm) | Hydrogen embrittlement susceptibility index S (%) | Tensile strength (MPa) |
|---|---|---|---|---|---|
| 1 | 12072 | 0.013 | 7 | 45 | 858 |
| 2 | 8779 | 0.009 | 5 | 25 | 805 |
| 3 | 14857 | 0.009 | 6 | 20 | 810 |
| 4 | 13591 | 0.008 | 6 | 40 | 854 |
| 5 | 12072 | 0.006 | 5 | 20 | 807 |
| 6 | 15195 | 0.009 | 6 | 25 | 865 |
| 7 | 15702 | 0.012 | 6 | 10 | 949 |
| 8 | 13253 | 0.007 | 5 | 25 | 958 |
| 9 | 16715 | 0.017 | 8 | 35 | 879 |
| 10 | 11818 | 0.015 | 8 | 30 | 816 |
| 11 | 6922 | 0.009 | 9 | 55 | 842 |
| 12 | 15702 | 0.002 | 9 | 55 | 825 |
| 13 | 13000 | 0.011 | 5 | 25 | 916 |
| 14 | 7429 | 0.015 | 6 | 40 | 918 |
| 15 | 15026 | 0.011 | 7 | 30 | 807 |
| 16 | 7851 | 0.016 | 9 | 55 | 973 |
| 17 | 17137 | 0.011 | 11 | 55 | 949 |
| 18 | 7682 | 0.006 | 6 | 45 | 837 |
| 19 | 19585 | 0.013 | 7 | 10 | 791 |
| 20 | 11650 | 0.004 | 5 | 45 | 839 |
| 21 | 13507 | 0.009 | 6 | 45 | 947 |
| 22 | 13591 | 0.013 | 7 | 45 | 966 |
| 23 | 6162 | 0.003 | 5 | 55 | 970 |
| 24 | 14942 | 0.002 | 3 | 45 | 841 |
| 25 | 14435 | 0.015 | 11 | 55 | 873 |
| 26 | 9370 | 0.016 | 14 | 50 | 950 |

TABLE 6

| Test No. | Ti-containing oxide particles (number/mm²) | Amount of compound type V (mass %) | Average circle equivalent diameter of V-containing carbide (nm) | Hydrogen embrittlement susceptibility index S (%) | Tensile strength (MPa) |
|---|---|---|---|---|---|
| 27 | 13507 | 0.013 | 6 | 45 | 951 |
| 28 | 17474 | 0.002 | 6 | 55 | 834 |
| 29 | 14942 | 0.011 | 5 | 10 | 827 |
| 30 | 6585 | 0.014 | 8 | 45 | 899 |
| 31 | 6500 | 0.017 | 8 | 40 | 870 |
| 32 | 12494 | 0.017 | 16 | 80 | 819 |
| 33 | 19331 | 0.001 | 7 | 80 | 812 |
| 34 | 12831 | 0.001 | 7 | 80 | 771 |
| 35 | 4052 | 0.012 | 7 | 70 | 822 |
| 36 | 6838 | 0.001 | 6 | 75 | 775 |
| 37 | 13760 | 0.001 | 5 | 65 | 770 |
| 38 | 20935 | 0.000 | 6 | 85 | 761 |
| 39 | 10974 | 0.016 | 8 | 65 | 985 |
| 40 | 3208 | 0.012 | 6 | 80 | 979 |
| 41 | 15195 | 0.004 | 5 | 65 | 990 |
| 42 | 4052 | 0.008 | 7 | 80 | 982 |
| 43 | 4727 | 0.010 | 5 | 65 | 1025 |
| 44 | 4896 | 0.001 | 11 | 95 | 795 |
| 45 | 20091 | 0.018 | 13 | 75 | 990 |
| 46 | 2617 | 0.000 | 3 | 95 | 986 |
| 47 | 12072 | 0.015 | 9 | 85 | 1121 |
| 48 | 4390 | 0.010 | 7 | 80 | 1073 |
| 49 | 16461 | 0.008 | 6 | 85 | 1150 |
| 50 | 4812 | 0.013 | 7 | 75 | 991 |
| 51 | 4052 | 0.012 | 6 | 70 | 827 |
| 52 | 4390 | 0.011 | 8 | 80 | 818 |
| 53 | 12240 | 0.013 | 7 | 70 | 982 |

In view of the results described above, it can be considered as below (the following Nos. represent test Nos. in Tables 3 to 6). Nos. 1 to 31 are examples satisfying the requirements defined in the present invention. Since the number density of the Ti-containing oxide particles and the configuration of the V-containing carbide (amount of the compound type V, and average circle equivalent diameter) are appropriately controlled together with the chemical component composition, weld metals with high strength and excellent in the resistance to hydrogen embrittlement susceptibility are obtained.

On the other hand, Nos. 32 to 53 are examples outside of the requirements defined in the present invention in which at least one of the characteristics of the tensile strength and the resistance to hydrogen embrittlement susceptibility is deteriorated.

No. 32 is an example in which the heat input conditions upon welding are not appropriate, and the average circle equivalent diameter of the V-containing carbides is increased to increase and the hydrogen embrittlement susceptibility (resistance to hydrogen embrittlement susceptibility is deteriorated). No. 33 is an example in which the amount of total Al in the welding material is insufficient. The amount of the compound type V in the weld metal is decreased to increase the hydrogen embrittlement susceptibility.

No. 34 is an example in which the Ni content of the weld metal and the amount of the metal Al in the welding material are insufficient. The amount of the compound type V in the weld metal is decreased to increase the hydrogen embrittlement susceptibility and lower the tensile strength. No. 35 is an example in which the amount of the metal Al in the welding material is excessive. The number density of the Ti-containing particles in the weld metal is decreased to increase the hydrogen embrittlement susceptibility.

No. 36 is an example in which the Mn content in the weld metal and the amount of the metal Mg in the welding material are insufficient. The amount of the compound type V in the weld metal is decreased to increase the hydrogen embrittlement susceptibility and lower the tensile strength. No. 37 is an example in which the Mo content in the weld metal and the amount of the metal Zr in the welding material are insufficient. The amount of the compound type V in the weld metal is decreased to increase the hydrogen embrittlement susceptibility and lower the tensile strength.

No. 38 is an example in which the C-content and the amount of the compound type V in the weld metal are decreased. The hydrogen embrittlement susceptibility becomes higher and the tensile strength is lowered. No. 39 is an example in which the C-content in the weld metal is excessive. The tensile strength increases excessively to increase the hydrogen embrittlement susceptibility.

No. 40 is an example in which the Si content in the weld metal is excessive [(Ti+Mn/Si) of the welding material is also smaller]. The number density of the Ti-containing oxide particles is lowered to increase the hydrogen embrittlement susceptibility. No. 41 is an example in which the Mn content in the weld metal is excessive. The tensile strength increases excessively to increase the hydrogen embrittlement susceptibility.

No. 42 is an example in which the Ni content in the weld metal is excessive and (Ti+Mn/Si) of the welding material is also smaller. The number density of the Ti-containing oxide particles is lowered and the tensile strength increases excessively to increase the hydrogen embrittlement susceptibility. No. 43 is an example in which the Mo content in the weld metal is excessive [(Ti+Mn/Si) of the welding material is also smaller]. The number density of the Ti-containing oxide particles is also lowered and the tensile strength increases excessively to increase the hydrogen embrittlement susceptibility.

No. 44 is an example in which the Ti content in the weld metal is insufficient (total amount of Ti in the welding material is smaller). The number density of the Ti-containing oxide particles is lowered to increase the hydrogen embrittlement susceptibility. No. 45 is an example in which the Ti content in the weld metal Ti is excessive. The tensile strength increases excessively to increase the hydrogen embrittlement susceptibility.

No. 46 is an example in which the Si content in the weld metal is excessive and the V content is insufficient [(Ti+Mn/Si) of the welding material is also smaller]. The number density of the Ti-containing oxide particles is lowered, the amount of the compound type V in the weld metal is decreased, and the tensile strength increases excessively to increase the hydrogen embrittlement susceptibility. No. 47 is an example in which the V content in the weld metal is excessive. The tensile strength increases excessively to increase the hydrogen embrittlement susceptibility.

No. 48 is an example in which the Cr content in the weld metal is excessive. Further, since (Ti+Mn/Si) of the welding material is also smaller, the number density of the Ti-containing oxide particles is lowered to increase the hydrogen embrittlement susceptibility. No. 49 is an example in which the Nb content in the weld metal is excessive. The tensile strength increases excessively to increase the hydrogen embrittlement susceptibility.

No. 50 is an example in which the Cu content in the weld metal is excessive [(Ti+Mn/Si) of the welding material is also smaller]. The number density of the Ti-containing oxide particles is lowered to increase the hydrogen embrittlement susceptibility. No. 51 is an example in which the Al content in the weld metal is excessive. The number density of the Ti-containing oxide particles is lowered to increase the hydrogen embrittlement susceptibility.

No. 52 is an example in which the Zr content in the weld metal is excessive. The number density of the Ti-containing oxide particles is lowered to increase the hydrogen embrittlement susceptibility. No. 53 is an example in which the B content in the weld metal is excessive. The tensile strength increases excessively to increase the hydrogen embrittlement susceptibility.

While the present invention has been described specifically and with reference to specific embodiments, it will be apparent to persons skilled in the art that various changes or modifications can be added without departing from the gist and the scope of the invention.

The present application is based on the Japanese Patent Application filed on Apr. 8, 2011 (Japanese Patent Application No. 2011-086727), the content of which is herein incorporated for reference.

INDUSTRIAL APPLICABILITY

The weld metal of the present invention is used for welded structures and can reduce the susceptibility to hydrogen embrittlement.

The invention claimed is:

1. A weld metal comprising;
C: 0.02 to 0.12% (means "mass %" which is identical here and hereinafter for the chemical component composition), Si: 0.1 to 0.80%, Mn: 0.9 to 2.5%, Ni: 0.20 to 3.5%, Mo: 0.05 to 1.50%, Ti: 0.040 to 0.15%, V: 0.05 to 0.60%, N: 0.015% or less, not including 0%, and O: 0.030% or more respectively, with the balance of iron and unavoidable impurities, wherein
Ti-containing oxide particles containing Ti by 20% or more, and having a circle equivalent diameter of 0.15 to 1.0 µm are present by the number of 5,000/mm$^2$ or more, and the amount of V per total mass of the weld metal present as a compound in the weld metal is 0.002% or more and, further,
an average circle equivalent diameter of the V-containing carbide present in the weld metal is 15 nm or less.

2. The weld metal of claim 1, further containing at least one of the following elements:
Cr: 2.0% or less (not including 0%),
Nb: 0.15% or less (not including 0%)
Cu: 1.0% or less (not including 0%),
Al: 0.020% of less (not including 0%)
Zr: 0.10% or less (not including 0%), and
B: 0.0050% or less (not including 0%).

3. The weld metal of claim 1, wherein the Ti-containing oxide particles containing Ti by 20% or more, and having a circle equivalent diameter of 0.15 to 1.0 µm are present by the number of 5,000/mm$^2$ to 40,000/mm$^2$.

4. The weld metal of claim 1, wherein the Ti-containing oxide particles containing Ti by 20% or more, and having a circle equivalent diameter of 0.15 to 1.0 µm are present by the number of 5,000/mm$^2$ to 30,000/mm$^2$.

5. The weld metal of claim 1, wherein the Ti-containing oxide particles containing Ti by 20% or more, and having a circle equivalent diameter of 0.15 to 1.0 µm are present by the number of 5,000/mm$^2$ to 20,000/mm$^2$.

6. The weld metal of claim 1, wherein the amount of V per total mass of the weld metal present as a compound in the weld metal is 0.002% to 0.05%.

7. The weld metal of claim 1, wherein the average circle equivalent diameter of the V-containing carbides present in the weld metal is 12 nm or less.

8. The weld metal of claim 1, wherein the average circle equivalent diameter of the V-containing carbides present in the weld metal is 10 nm or less.

9. The weld metal of claim 1, wherein C is from 0.04 to 0.10%.

10. The weld metal of claim 1, wherein Si is from 0.25 to 0.7%.

11. The weld metal of claim 1, wherein Mn is from 1.2 to 2.2%.

12. The weld metal of claim 1, wherein Ni is from 0.5 to 3.0%.

13. The weld metal of claim 1, wherein Mo is from 0.1 to 1.0%.

14. The weld metal of claim 1, wherein Ti is from 0.050 to 0.12%.

15. The weld metal of claim 1, wherein V is from 0.1 to 0.6%.

16. The weld metal of claim 1, wherein V is from 0.15 to 0.6%.

17. The weld metal of claim 1, wherein N is 0.010% or less, not including 0%.

18. The weld metal of claim 1, wherein 0 is from 0.030 to 0.10%.

19. The weld metal of claim 1, wherein the unavoidable impurities are at least one selected form the group consisting of P, S ,and Sn.

20. The weld metal of claim 19, wherein P is present in an amount that does not exceed 0.02% and S is present in an amount that does not exceed 0.025%.

* * * * *